United States Patent [19]

Ziegler et al.

[11] Patent Number: 4,838,010
[45] Date of Patent: Jun. 13, 1989

[54] ELECTRONICS ENCLOSURE FOR AN AGRICULTURAL COMBINE

[75] Inventors: Duane H. Ziegler, Colona; Dennis A. Kerckhove, East Moline; Jerry W. Hansen, Port Byron, all of Ill.; Barry K. Denning, Central City, Nebr.

[73] Assignee: Deere & Company, Moline, Ill.

[21] Appl. No.: 212,363

[22] Filed: Jun. 27, 1988

Related U.S. Application Data

[63] Continuation of Ser. No. 67,759, Jun. 29, 1987, abandoned.

[51] Int. Cl.$^4$ .............................................. A01D 41/00
[52] U.S. Cl. .............................. 56/10.2; 56/DIG. 15; 340/684
[58] Field of Search ......................... 56/10.2, DIG. 15; 340/684

[56] References Cited

U.S. PATENT DOCUMENTS

| | | | |
|---|---|---|---|
| 4,159,474 | 6/1979 | Wooldridge | 340/684 |
| 4,376,298 | 3/1983 | Sokol et al. | 340/684 |
| 4,396,087 | 8/1983 | Rock et al. | 56/10.2 |
| 4,532,757 | 8/1985 | Tutle | 56/DIG. 15 |
| 4,551,801 | 11/1985 | Sokol | 340/384 |

Primary Examiner—Paul J. Hirsch

[57] ABSTRACT

An agricultural combine is provided with electronic controller cards for assisting in controlling and monitoring the combine. The cards are housed in an enclosure located adjacent to the operator's cab above the ground engaging wheels. The enclosure comprises a box mounted in an aperture formed in the supporting structure and a cover which can be latched to the box. The cover is provided with a number of inwardly extending fingers each having a receiving groove for holding the electronic controller cards. The fingers are arranged in pairs for engaging the cards between the fingers. Openings in the cover are located adjacent to each finger pair for providing an opening through which the electronic controller car held therein can communicate with the wiring harness of the combine. Each opinion is provided with an outwardly extending and encircling flange which engaged a rubber boot of the wiring harness.

14 Claims, 3 Drawing Sheets

ELECTRONICS ENCLOSURE FOR AN AGRICULTURAL COMBINE

This application is a continuation of application Ser. No. 067,759, filed June 29, 1987, now abandoned.

BACKGROUND OF THE INVENTION

The present invention is directed to an electronic controller card enclosure located on an agricultural combine having a box that is fixedly mounted to the supporting structure of the combine. The box is provided with a sealing cover having inwardly projecting fingers for holding electronic controller cards.

As agricultural combines become more sophisticated, the use of electronic control means, such as microprocessors and related circuitry becomes more prevalent. With other large off-road vehicles, the electronic control means have been mounted on electronic controller cards which are readily replaceable. Agricultural combines operate in a very dirty and dusty environment and the electronic control means must be protected from the dust and dirt if the combine is to operate efficiently. In addition, the electronic control means must be readily accessible so that it can be repaired easily.

The present invention provides an enclosure for electronic controller cards which both protects the cards from the harsh environment in which the combine operates, while also being readily accessible for the replacement and maintenance of the controller cards.

SUMMARY OF THE INVENTION

The present invention comprises an agricultural combine having a sealed enclosure in which the electronic controller cards are housed. The enclosure comprises a plastic box that is inserted into an aperture formed in the supporting structure of the combine. The box has an open exposed side on which is positioned a plastic cover. No electronic controller cards are secured to the inside of the box, but rather are secured to inwardly projecting fingers extending from the removable cover. The cover is also provided with apertures adjacent to the electronic controller cards so that a connecting plug of an electric cable assembly can be inserted through the apertures to connect with a corresponding plug on the controller cards. An outwardly projecting flange surrounds the aperture and is gripped by a rubber boot of an electric cable assembly. The cover is provided with an annular groove having a resilient sealing gasket which abuts against the edge of the box in a sealing relationship. Attaching means located at the side of the cover and box are used to hold the cover in place.

The electronic enclosure is located on the combine adjacent to the operators cab. It is located above the ground engaging means to minimize dust and dirt. In addition, the enclosure is located behind a sheet metal shroud extending about the supporting structure. The shroud having an openable door through which the electronics enclosure can be accessed.

DETAILED DESCRIPTION

Figure 1:
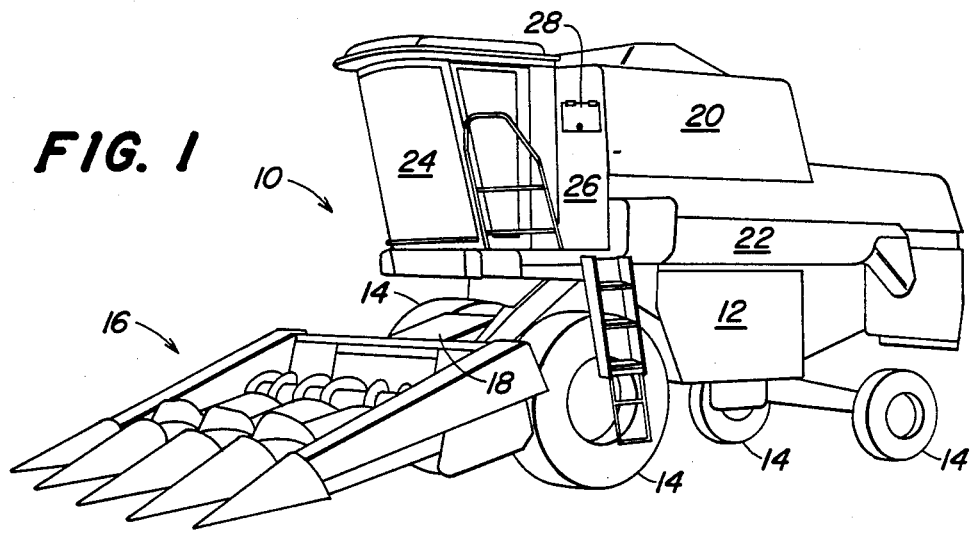
FIG. 1 is a perspective view of an agricultural combine having a central enclosure for the electronic controller cards.
Figure 2:
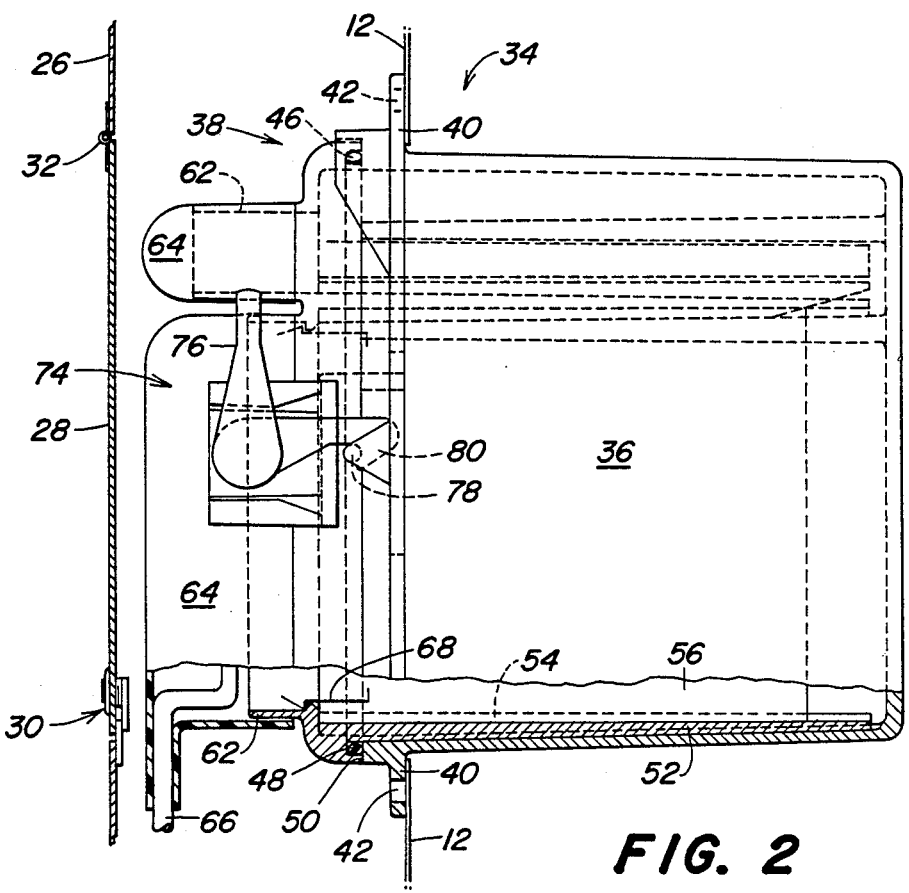
FIG. 2 is a partial cross sectional view of the electronics enclosure.

FIG. 1 illustrates a self-propelled agricultural combine 10 having a supporting structure 12 with downwardly depending ground engaging wheels 14. Extending in front o the combine is harvesting platform 16 which is operatively coupled to feeder house 18 for directing a harvested crop inside of the combine. Threshing and separating means are located inside of the combine and separate the grain from the straw and chaff of the crop. The subject invention is not limited to any particular threshing and separating means and could be used with an axial flow machine or a conventional machine having a transverse threshing cylinder and straw walkers. The straw and chaff are directed out of the back of the combine while the grain is conveyed into clean grain compartment 20. The clean grain compartment is provided with an unloading auger assembly 22 for directing the grain into a receiving truck.

The combine is provided with an operator's cab 24 having a number of operating assemblies located therein for controlling the operating means of the combine. Adjacent to the operator's cab on front wall 26 is openable door 28 having latching assembly 30 and hinge 32. Front wall 26 and many other exterior walls of the combine are made of sheet metal secured to the supporting structure of the machine. The sheet metal walls form a shroud around the supporting structure.

Located behind door 28 is electronics enclosure 34 which comprises plastic box 36 and plastic cover member 38. The box is set in an aperture formed in the supporting structure and is provided with an outwardly extending lip 40 which provides a mounting surface for attaching the box to the supporting structure. Lip 40 is provided with holes 42 that provide a mounting means for securing the box to the supporting structure. More specifically, bolts or other attachment means maybe inserted through holes 42 and aligned holes provided in the supporting structure for mounting the box in the aperture.

Figure 3:
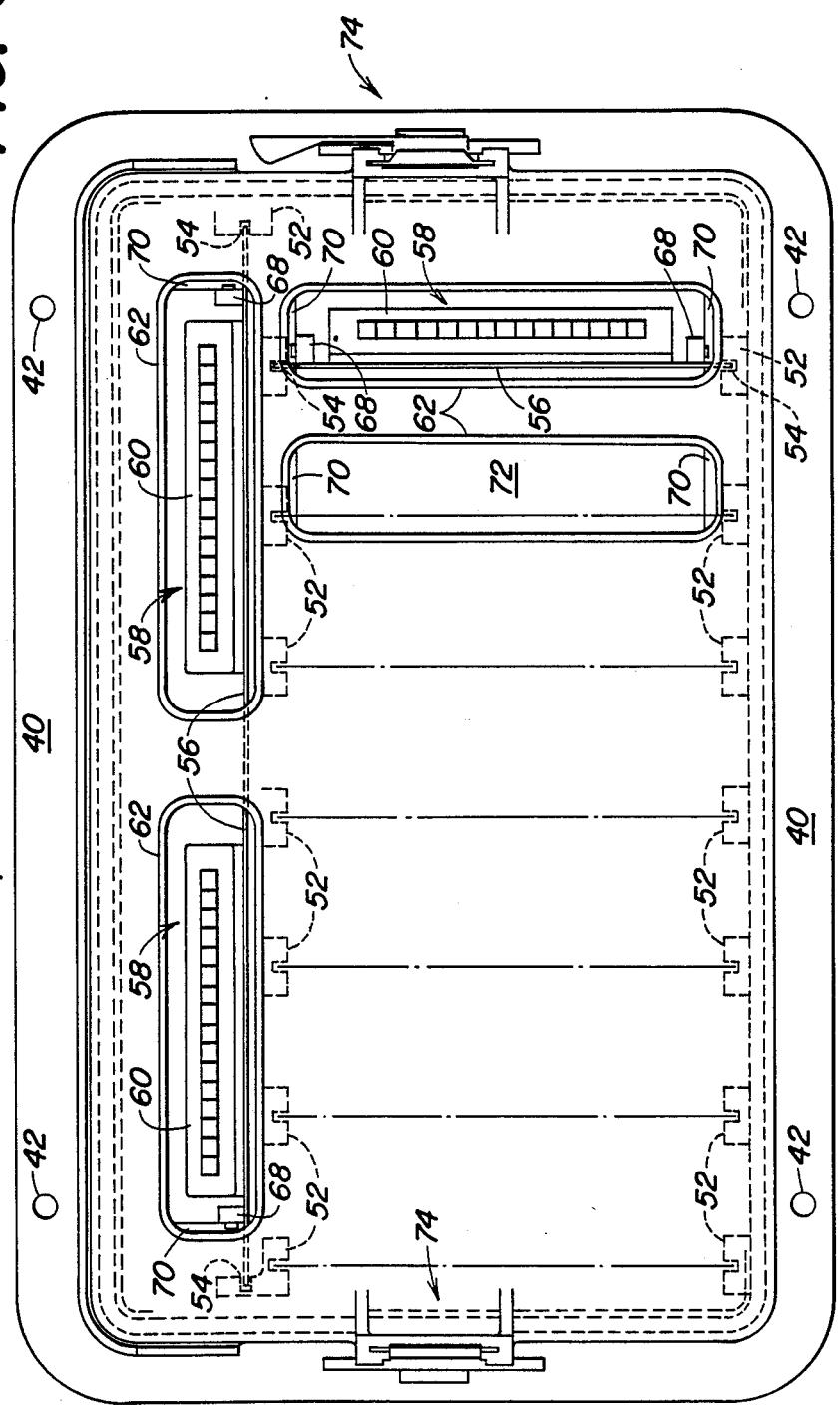
FIG. 3 is a frontal view of the electronics enclosure.
Figure 4:
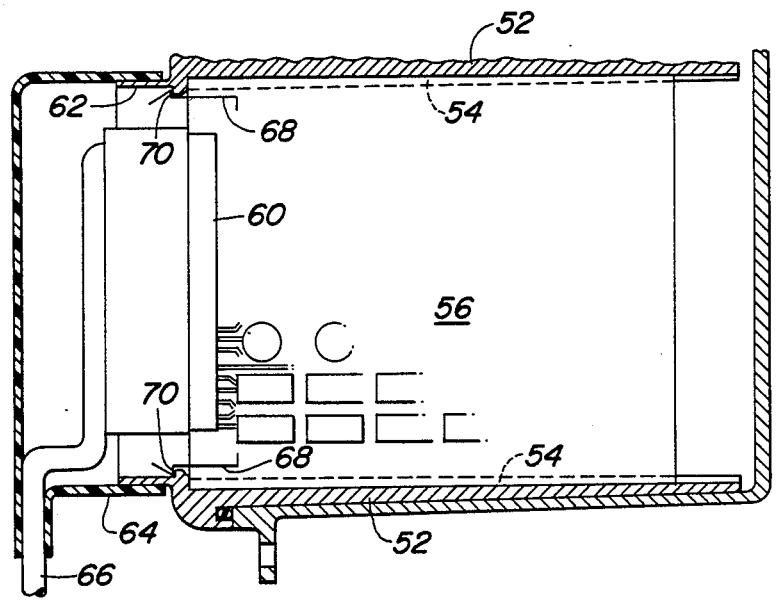
FIG. 4 is a fragmentary cross sectional view of the electronics enclosure.

Cover 38 is provided with an annular groove 46 having a resilient sealing gasket 48 which engages outer peripheral edge 50 of box 36 for sealing the interface between the cover and the box. Extending inwardly from the cover into the box are a plurality of fingers 52 arranged in pairs with each finger having a groove 54. Electronic controller cards 56 are mounted in these grooves between the finger pairs as illustrated in FIGS. 3 and 4. The cover is also provided with openings 58 located between the finger pairs which are used to access the cards. More specifically, the cards are provided with electrical connectors 60 which are positioned adjacent to the openings. An outwardly extending flange 62 surrounds the opening and provides a surface on which rubber boot 64 of cable assembly 66 can be mounted.

Fixedly attached to each card is clip 68 that engages ledge 70 of the apertures to prevent the backward movement of the card. The clip is made from resilient metal and engages the ledge as the card is inserted into the appropriate finger pair from the back. The clip is mounted to the card by at least two metal pins that are inserted into holes located on the card.

As illustrated in FIG. 3, the enclosure can accommodate a number of electronic controller cards and can be expanded from the two cards illustrated in the drawings. Typically, when the cover is made, each of the aperture would be covered by a knock out plate 72 having a flangible perimeter that can be readily broken when a new aperture is to be used. In FIG. 3, for simplicity, only one knock out covered aperture is illustrated, however, more could be provided adjacent to each finger pair.

Located on each side of the enclosure are latching means 74 which are used to latch the cover to the box. More specifically, the latching means comprises a pivotal hooking member 76 that is mounted to the cover and is adapted and constructed to engage pin 78 extending from the side of the box. When latching the cover to the box, the cover is pressed inwardly compressing the resilient gasket and the hooking member is pivoted to engage pin 78. Pin 78 extends inwardly from and is supported on triangular member 80 which extends outwardly from lip 40. After the cover is released, the resilient gasket forces the cover backward locking the pin in the hooking member.

The present invention should not be limited to the above-described embodiments, but should be limited solely to the claims that follow.

We claim:

1. A self-propelled agricultural combine for harvesting a crop from a field, and threshing and separating grain from straw and chaff of the harvested crop, the agricultural combine comprising:
   a supporting structure;
   operating means are mounted to the supporting structure and include, a propulsion means for propelling the supporting structure, a harvesting means extending from the supporting structure for harvesting a crop from a field, threshing and separating means located inside the supporting structure for separating grain from straw and chaff of the harvested crop, and a feeder house means for directing a harvested crop from the harvesting means to the threshing and separating means;
   ground engaging means extending from the supporting structure for supporting the supporting structure above a field and when rotated by the propulsion means, the ground engaging means provides a means for propelling the supporting structure about a field;
   electronic control means for controlling the operations of at least one of the operating means, the electronic control means being mounted on electronic controller cards;
   operator control assemblies for controlling the propulsion means, the harvesting means, and the threshing and separating means through the electronic control means;
   wiring means for electrically coupling the operator control assemblies to the electronic control means and the operating means;
   a box having an open side is fixedly mounted to the supporting structure;
   a covering for closing the open side of the box has an inwardly facing side and an outwardly facing side, the inwardly facing side is provided with a plurality of fingers for holding the electronic controller cards, the cover is further provided with a plurality of openings through which the electronic controller cards can be accessed; and
   latching means for latching the cover to the box so that the electronic controller cards extend inside the box as the cover is attached to the box.

2. An agricultural combine as defined by claim 1 wherein the cover and the box form an interface which is provided with a resilient sealing gasket forming a seal between the cover and the box at the interface.

3. An agricultural combine as defined by claim 2 wherein the electronic controller cards are provided with electronic connectors which are located adjacent to the openings formed in the cover and which are adapted and constructed to connect with electrical connectors of the wiring means through the opening.

4. An agricultural combine as defined by claim 3 further comprising an operator cab in which the operator control assemblies are located, the operator's cab is located at the front of the supporting structure and above the ground engaging means.

5. An agricultural combine as defined by claim 4 wherein the box is mounted into an aperture formed in the supporting structure located above the ground engaging means adjacent to the operator's cab.

6. An agricultural combine as defined by claim 5 further comprising a sheet metal shroud that is mounted to the supporting structure and extends outwardly therefrom, the shroud overlying the electronic box, the shroud is provided with an openable access door which overlies the box.

7. An agricultural combine as defined by claim 6 wherein the box and the cover are made of plastic.

8. An agricultural combine as defined by claim 3 wherein the resilient sealing gasket is mounted in an annular groove located on the cover and which is located adjacent to a peripheral sealing edge on the box when the cover is latched to the box.

9. An agricultural combine as defined by claim 8 wherein the openings in the cover are provided with an outwardly extending and encircling flange which is adapted and constructed to engage a sealing boot of the wiring means.

10. An agricultural combine as defined by claim 9 wherein each of the inwardly extending fingers is provided with a receiving groove for engaging the electronic controller cards.

11. An agricultural combine as defined by claim 10 wherein the inwardly extending fingers are arranged in pairs thereby engaging the electronic controller cards between the pair of fingers in the receiving grooves.

12. An agricultural combine as defined by claim 11 wherein the electronic controller cards are provided with at least one clip which engages a ledge formed adjacent to the opening in the cover for holding the card in place between the finger pairs.

13. An agricultural combine as defined by claim 12 wherein unused openings are provided with knock out plates having a frangible perimeter so that the plate can be readily removed.

14. A self-propelled agricultural combine for harvesting a crop from a field, and threshing and separating grain from straw and chaff of the harvested crop, the agricultural combine comprising:
   a supporting structure;
   operating means are mounted to the supporting structure and include, a propulsion means for propelling the supporting structure, a harvesting means extending from the supporting structure for harvesting a crop from a field, threshing and separating means located inside the supporting structure for separating grain from straw and chaff of the harvested crop, and a feeder house means for directing a harvested crop from the harvesting means to the threshing and separating means;

ground engaging means extending from the supporting structure for supporting the supporting structure above a field and when rotated by the propulsion means the ground engaging means provides a means for propelling the supporting structure about a field;

electronic control means for controlling the operation of at least one of the operating means, the electronic control means being mounted on electronic controller cards;

operator control assemblies for controlling the propulsion means, the harvesting means, and the threshing and separating means through the electronic control means;

wiring means for electrically coupling the operator controls assemblies to the electronic control means and the operating means;

a box having an open side is fixedly mounted to the supporting structure;

a cover for closing the open side of the box has an inwardly facing side and an outwardly facing side, the inwardly facing side is provided with a holding means for holding the electronic controller cards, the cover is further provided with a plurality of openings through which the electronic controller cards can be accessed, each of the openings are provided with an outwardly extending and encircling flange which is adapted and constructed to engage a sealing boot of the wiring means; and latching means for latching the cover to the box so that the electronic controller cards extend inside the box as the cover is attached to the box.

* * * * *